United States Patent [19]

Zhao

[11] Patent Number: 5,193,142
[45] Date of Patent: Mar. 9, 1993

[54] TRAINING MODULE FOR ESTIMATING MIXTURE GAUSSIAN DENSITIES FOR SPEECH-UNIT MODELS IN SPEECH RECOGNITION SYSTEMS

[75] Inventor: Yunxin Zhao, Santa Barbara, Calif.

[73] Assignee: Matsushita Electric Industrial Co., Ltd., Osaka, Japan

[21] Appl. No.: 613,352

[22] Filed: Nov. 15, 1990

[51] Int. Cl.$^5$ .............................................. G10L 9/00
[52] U.S. Cl. ...................................................... 395/2
[58] Field of Search ................................... 381/41–50; 395/2

[56] References Cited

U.S. PATENT DOCUMENTS

| | | | |
|---|---|---|---|
| 4,032,711 | 6/1977 | Sambar | 381/42 |
| 4,241,329 | 12/1980 | Bahler et al. | 381/45 |
| 4,741,036 | 4/1988 | Bahl et al. | 395/2 |
| 4,833,712 | 5/1989 | Bahl et al. | 395/2 |

OTHER PUBLICATIONS

Rabiner et al., "Speaker-Independent Recognition of Isolated Words Using Clustering Techniques", IEEE Trans. On ASSP, vol. ASSP-27, No. 4, Aug. 1979, pp. 336–349.
"Recent Developments in the Application of Hidden Markov Models to Speaker-Independed Isolated Word Recognition".
Biing-Hwang Juang and Lawrence R. Rabiner/Mixture Autoregressive Hidden Markov Models for Speech Signals/Dec. 1985.
Brian Hanson and Hisashi Wakita/Spectral Slope Distance Measures with Linear Prediction Analysis for World Recognition in Noise/Jul. 1987.
Hynek Hermansky, Brian A. Hanson and Hisashi Wakita/Perpetually Based Linear Predictive Analysis of Speech/1985.
C. H. Lee, L. R. Rabiner, R. Pieraccini and J. G. Wilpon/Acoustic Modeling for Large Vocabulary Speech Recognition/1990.
Lawrence R. Rabiner, Jay G. Wilpon and Biing-Hwang Juang/A Segmental k-Means Training Procedure for Connected Word Recognition/AT&T Technical Journal/May/Jun. 1986, vol. 65, Issue 3.

*Primary Examiner*—Michael R. Fleming
*Assistant Examiner*—David D. Knepper
*Attorney, Agent, or Firm*—Price, Gess & Ubell

[57] ABSTRACT

A model-training module generates mixture Gaussian density models from speech training data for continuous, or isolated word HMM-based speech recognition systems. Speech feature sequences are labeled into segments of states of speech units using Viterbi-decoding based optimized segmentation algorithm. Each segment is modeled by a Gaussian density, and the parameters are estimated by sample mean and sample covariance. A mixture Gaussian density is generated for each state of each speech unit by merging the Gaussian densities of all the segments with the same corresponding label. The resulting number of mixture components is proportional to the dispension and sample size of the training data. A single, fully merged, Gaussian density is also generated for each state of each speech unit. The covariance matrices of the mixture components are selectively smoothed by a measure of relative sharpness of the Gaussian density. The weights of the mixture components are set uniformly initially, and are reestimated using a segmental-average procedure. The weighting coefficients, together with the Gaussian densities, then become the models of speech units for use in speech recognition.

30 Claims, 6 Drawing Sheets

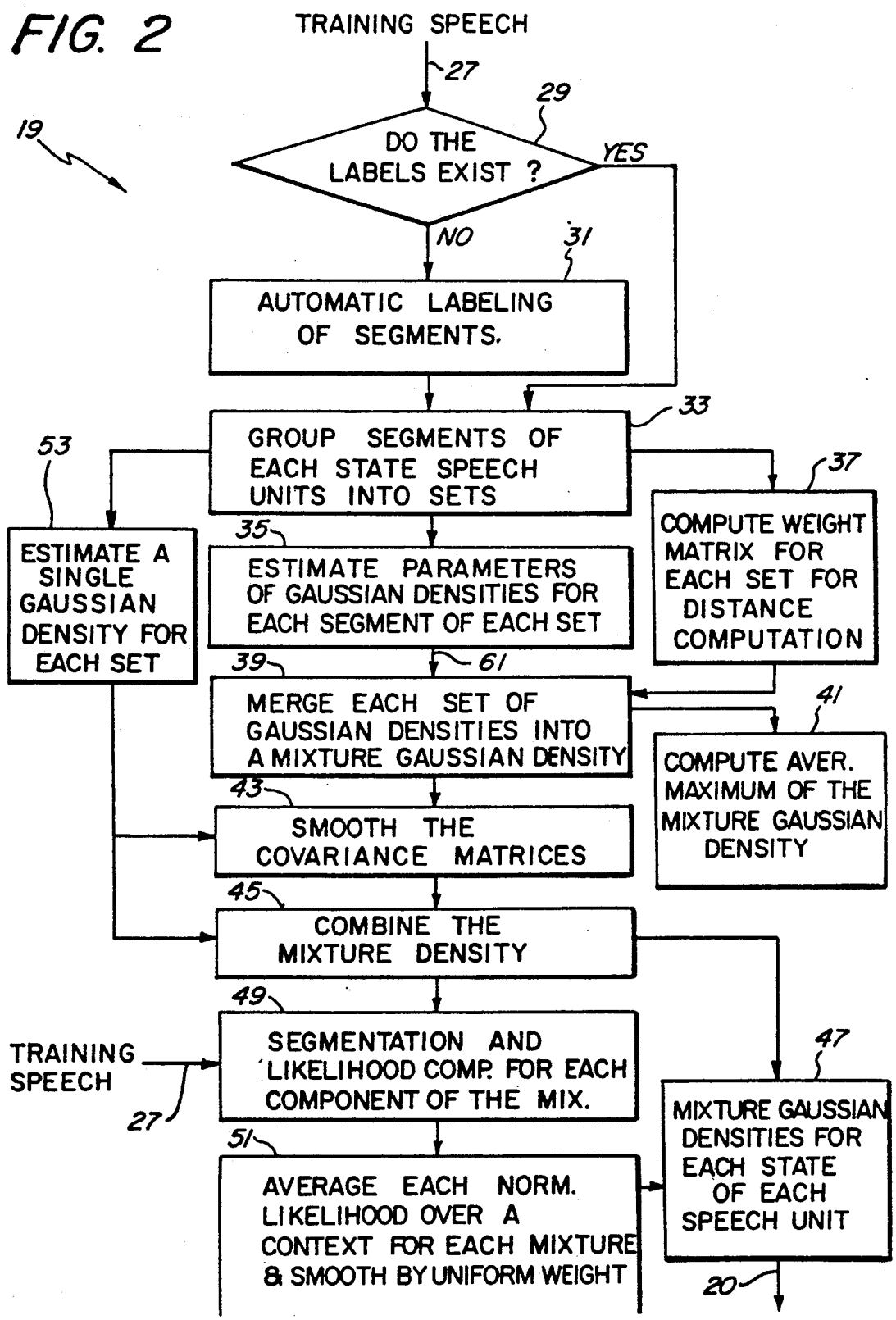

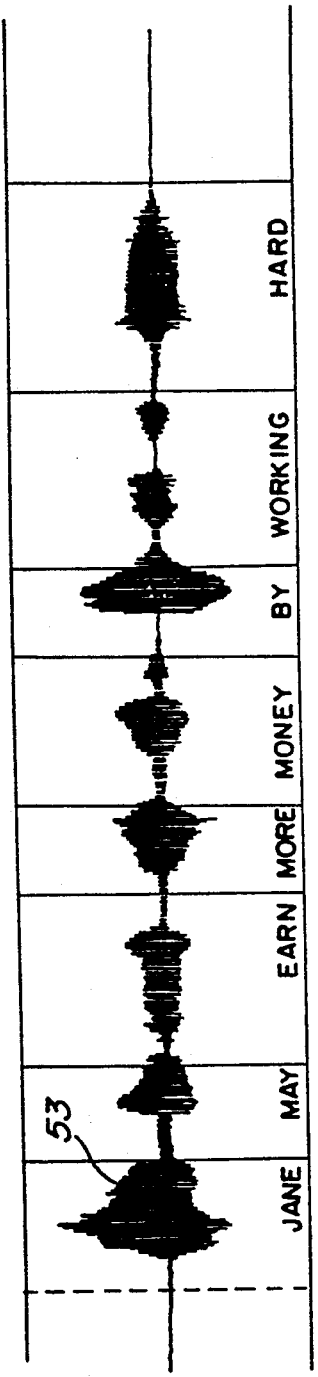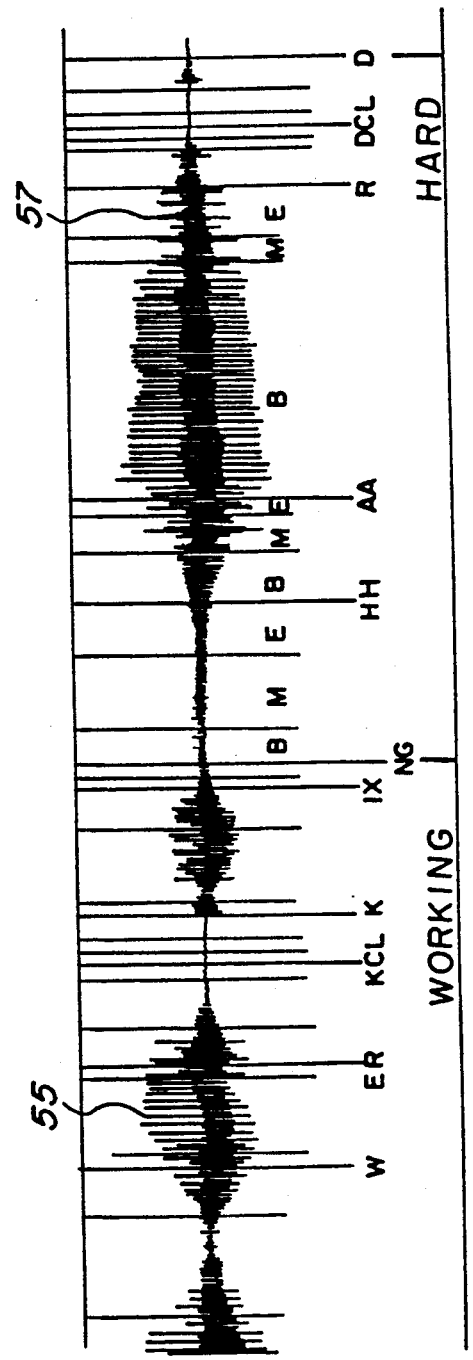
FIG. 3(a)
FIG. 3(b)

TRAINING MODULE FOR ESTIMATING MIXTURE GAUSSIAN DENSITIES FOR SPEECH-UNIT MODELS IN SPEECH RECOGNITION SYSTEMS

BACKGROUND OF THE INVENTION

1. Field of the Invention

The present invention relates to speech recognition in general and, in particular, to estimating mixture Gaussian densities of speech-unit models for hidden Markov model (HMM) based speech recognition systems.

2. Description of Related Art

In speech recognition systems, particularly in hidden Markov model based speech recognition systems, a training module which generates probabilistic models of speech units is a very important component. Its functionality affects the system recognition performance significantly. Among the probabilistic models of speech units, mixture Gaussian density models have been successfully used in models of word unit or phoneme-sized unit for tasks such as isolated word recognition, as well as continuous speech recognition. A mixture Gaussian density consists of a plurality of Gaussian densities, $\eta(\mu_i, C_i)$ $i=1, \ldots K$, and a plurality of weights for each Gaussian density, $a_i$, $i=1, \ldots K$, where $a_i \geq 0$ and $$\sum_{i=1}^{K} a_i = 1.$$

In a training module of a speech recognition system, the parameters of the Gaussian densities and the weights are estimated from the training speech data. The existing techniques of estimating parameters of mixture Gaussian density of models of speech units are primarily the extension of the Baum-Welch algorithm, see B. H. Juang et al., "Mixture Autoregressive Hidden Markov Models for Speech Signals," IEEE Trans. ASSP, ASSP-33, pp. 1404-1413, and the segmental K-means algorithm, see L. R. Rabiner et al., "A Segmental K-means Training Procedure for Connected Word Recognition," AT&T Technical Journal, Vol 65(3), pp. 21-31, which have been used successfully in some speech recognition systems. These techniques start from a chosen number of mixture components, and chosen initial parameters for each Gaussian density, and then iteratively improve the parameter estimates through likelihood maximization or distortion minimization. The likelihood or distortion is computed from frame-based scores of speech features, and the parameter estimates of a mixture Gaussian density are dependent on the initial choice of the number of mixture components, as well as the initial parameters of each Gaussian density.

The present invention provides a training module for speech recognition systems with a new technique for estimating the parameters of mixture Gaussian densities for models of speech units. The advantages of this technique will become readily apparent upon considering the present invention.

SUMMARY OF THE INVENTION

It is an object of the present invention to estimate a mixture Gaussian density of a model of a speech unit without the need for fixing the number of mixture components of a priori. Instead, the number of components of a mixture density is proportional to the dispersion and sample size of the training data.

It is another object of the present invention to estimate a mixture Gaussian density of a model of a speech unit without the need for initializing parameters of each mixture component, thus making the estimates of model parameters independent of the initial conditions.

It is a further object of the present invention to estimate a mixture Gaussian density of a model of a speech unit with the incorporation of the segmental structure of the speech signals. The description of speech signals by segmental structures takes into account the correlation between neighboring frames and is therefore more accurate than assuming independence between neighboring frames.

It is yet another object of this invention to provide reliable estimates of the parameters of mixture Gaussian densities.

It is still further an object of the present invention to provide a computation efficient method of estimating weights for the mixture densities.

The present invention is a module in a speech recognition system which trains models for speech units. The feature vectors, extracted from speech data, are supplied to the module for model training. The model-training module groups together the segments corresponding to the same state and the same speech unit, and estimates a Gaussian density for each segment. Each set of the Gaussian densities are merged into a mixture Gaussian density. The number of mixture components in a Gaussian density is proportional to the dispersion and sample size of its training data. The mixture Gaussian density model is estimated for each state of each speech unit. The weights of these Gaussian densities are estimated by a segmental average procedure for each state of each speech unit under each speech-unit context environment. The mixture density models thus estimated are then used as reference models in the speech recognition process.

BRIEF DESCRIPTION OF THE DRAWINGS

The exact manner of operation of the present invention, as well as its advantages, may best be understood by reference to the following detailed descriptions, in conjunction with the accompanying drawings, in which like reference numerals designate like parts throughout the figures, and wherein:

FIG. 2 is a flow chart for estimating mixture Gaussian density models for speech units by the model training module;

FIGS. 3(a) and 3(b) are wave diagrams showing segmentation of a passage of speech;

FIG. 3(a) shows labeling of boundaries of words within a sentence;

FIG. 3(b) shows labeling of boundaries of segments within phonemes;

DESCRIPTION OF THE PREFERRED EMBODIMENTS

Figure 1:
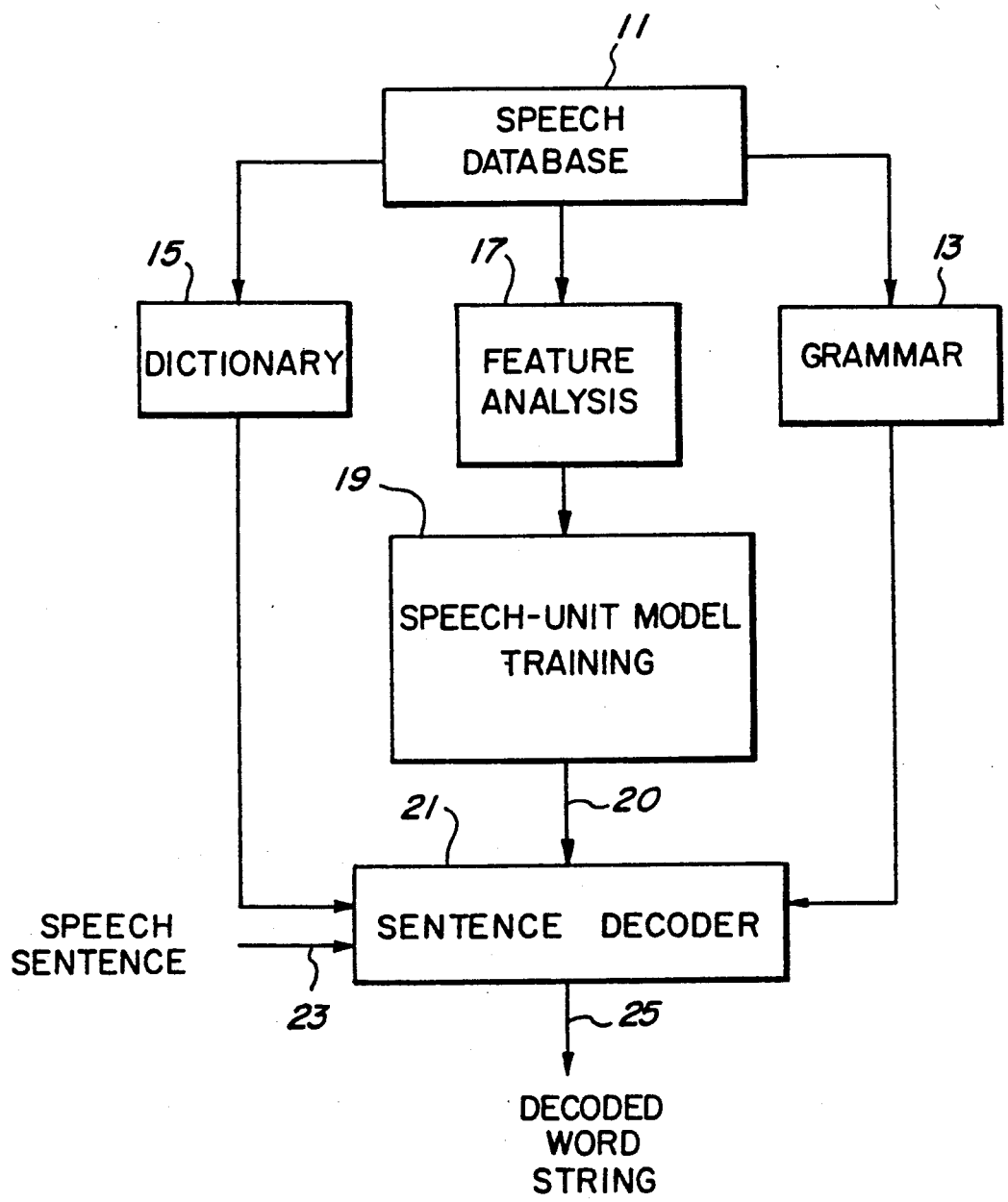
FIG. 1 is a block diagram of a continuous speech recognition system.

The present invention is implemented as a module for training mixture Gaussian density models for speech units in a continuous speech recognition system of the type illustrated in FIG. 1. From a corpus of training speech data, such as a speech database 11, the module of feature analysis 17 first converts speech data samples into a sequence of framed-based feature vectors, preferably the analysis parameters from a perceptually based linear prediction technique, see H. Hermansky et al., "Perceptually Based Linear Prediction Analysis of Speech," Proc. ICASSP, pp. 509–512, Tampa, Fla., 1985. The model training module 19, according to the present invention, takes as input the feature sequences and then generates mixture Gaussian density models for each speech unit. The dictionary 15 describes the composition of words from the speech unit models. The grammar module 13 describes the syntactic rules for making a sentence from word strings. The models of speech units from the output of the model training module 19, the dictionary 15, and the grammar 13 are used as reference for the decoder 21 in decoding a spoken sentence 23 into a decoded word string 25. Note that the training module 19 can also be used with equal effect in speech recognition systems for recognizing isolated words.

FIG. 2 is a detailed flow diagram for the model training module 19. The labels 29 refer to the boundaries of segments in the training speech 27, where each segment corresponds to a state of a speech unit in HMM terminology.

When the labels for the boundaries of the segments are readily available, i.e., are part of the database, they are used together with the speech feature sequence in the training module 19. In case such labels do not exist, a submodule 31 will do the segmentation and labeling.

The segmentation is based on the Viterbi decoding algorithm. Using a reference text, the transcription of words in terms of the phoneme-sized speech units, and some simple probabilistic models of the speech units with preferred topological structure of the HMM models, the submodule 31 can generate all the necessary labels for segment boundaries. Note that the number of states in a speech unit are not necessarily limited to three, such as B, M, E shown in FIG. 3. Simple probabilistic models for the speech units can be obtained from a small amount of training speech data which are readily available. The manner of operation of the submodule for segmentation is well known in the prior art and will not be explained in detail in the present invention, for the purpose of clarity and brevity.

FIG. 3 illustrates a preferred training speech sentence 27 received from database 11, with the sentence being segmented into words, the words segmented into phonemes, and the phonemes into states, as would be performed by the automatic segment labeling module 31. FIG. 3(a) shows the waveform 53 of a sentence being segmented into a word string, "Jane may earn more money by working hard." FIG. 3(b) shows the segmentation of the words "working," having a waveform 55, and "hard," having a waveform 57, into respective phonemes and states. The phonemes for "working" are w, er, kcl, k, ix, ng. The phonemes for "hard" are hh, aa, r, dcl, d. FIG. 3(b) also shows the labels B, M, and E, for the states of the phonemes /hh/, /aa/, and /r/ in the word "hard."

For each segment consisting of a number of successive frames, the parameters of the Gaussian density, a mean vector $\mu$ and a covariance matrix C, are calculated by sample mean and sample covariance, and the number of frames in the segment is recorded. Let such a segment be indexed by i, its number of frames be $L_i$, and the lth feature vector within the segment be $x_l^{(i)}$, then the sample mean and sample covariance are computed as:

$$\hat{\mu}_i = \frac{1}{L_i} \sum_{l=1}^{L_i} x_l^{(i)} \tag{1}$$

and $$\hat{C}_i = \frac{1}{L_i} \sum_{l=1}^{L_i} (x_l^{(i)} - \hat{\mu}_i)(x_l^{(i)} - \hat{\mu}_i)', \tag{2}$$

where in equation (2) the prime "'" is a vector transpose operation. The parameters of the Gaussian densities of the segments belong to the same state of the same speech unit or word, since they were sorted together by submodule 33 (FIG. 2).

Figure 4:
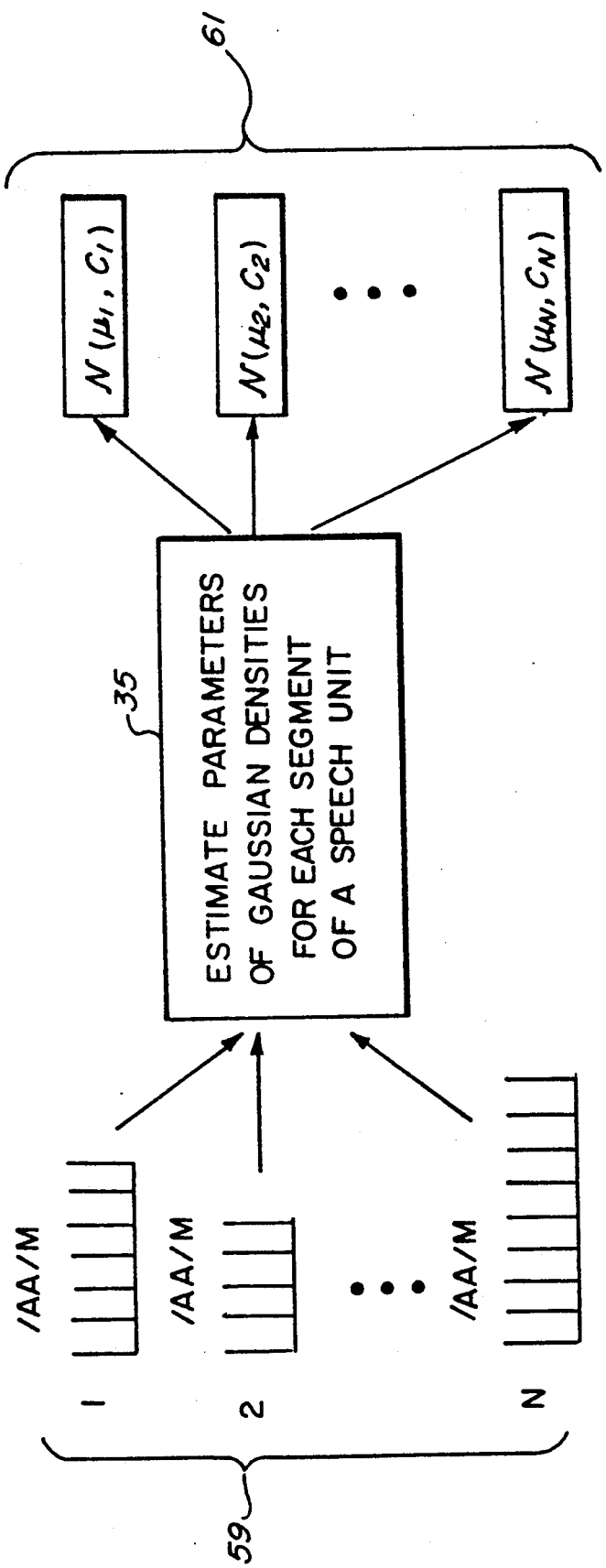
FIG. 4 is a diagrammatic illustration showing segments corresponding to the same state of the same speech unit being grouped together and their Gaussian density parameters estimated.

FIG. 4 illustrates the segments 59 of the state M of the speech unit of phoneme /aa/ being grouped together. Their Gaussian density parameters are then estimated by module 35 and arranged together as a set 61. Each set of the Gaussian density parameters corresponding to a state of a speech unit are then merged into a mixture Gaussian density by the module 39 (FIG. 2).

Figure 5:
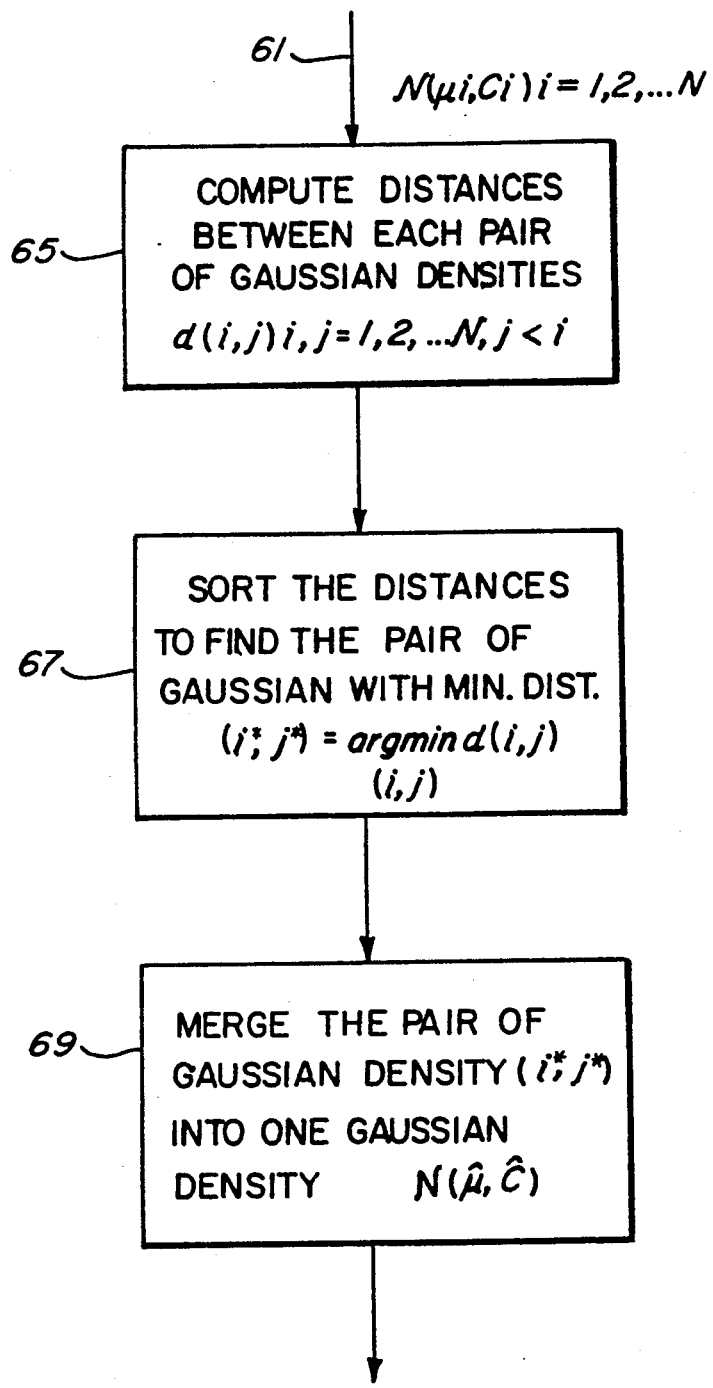
FIG. 5 is a flow diagram showing one step in the model merging procedure, where one pair of Gaussian densities are merged from among N Gaussian densities.

FIG. 5 shows a procedure for merging one pair of Gaussian densities from among N Gaussian densities. First, the distances between all pairs of Gaussian densities in a set are calculated 65. Then the indices of the pair of Gaussian densities with the minimum distance are searched 67. In FIG. 5 the indices of this pair are illustrated as i* and j*. This pair of Gaussian densities $\eta(\mu_{i*}, C_{i*})$ and $\eta(\mu_{j*}, C_{j*})$ are then merged 69 into a single Gaussian density $\eta(\hat{\mu}, \hat{C})$ through the following operation:

$$\lambda_i^* = \frac{L_i^*}{L_i^* + L_j^*} \tag{3}$$

$$\lambda_j^* = \frac{L_j^*}{L_i^* + L_j^*} \tag{4}$$

$$\hat{\mu} = \lambda_i^* \mu_i^* + \lambda_j^* \mu_j^*$$
$$\hat{C} = \lambda_i^* C_i^* + \lambda_j^* C_j^* + \lambda_i^* \lambda_j^* (\mu_i^* - \mu_j^*)(\mu_i^* - \mu_j^*)' \tag{5}$$
and
$$\hat{L} = L_i^* + L_j^*.$$

Figure 6:
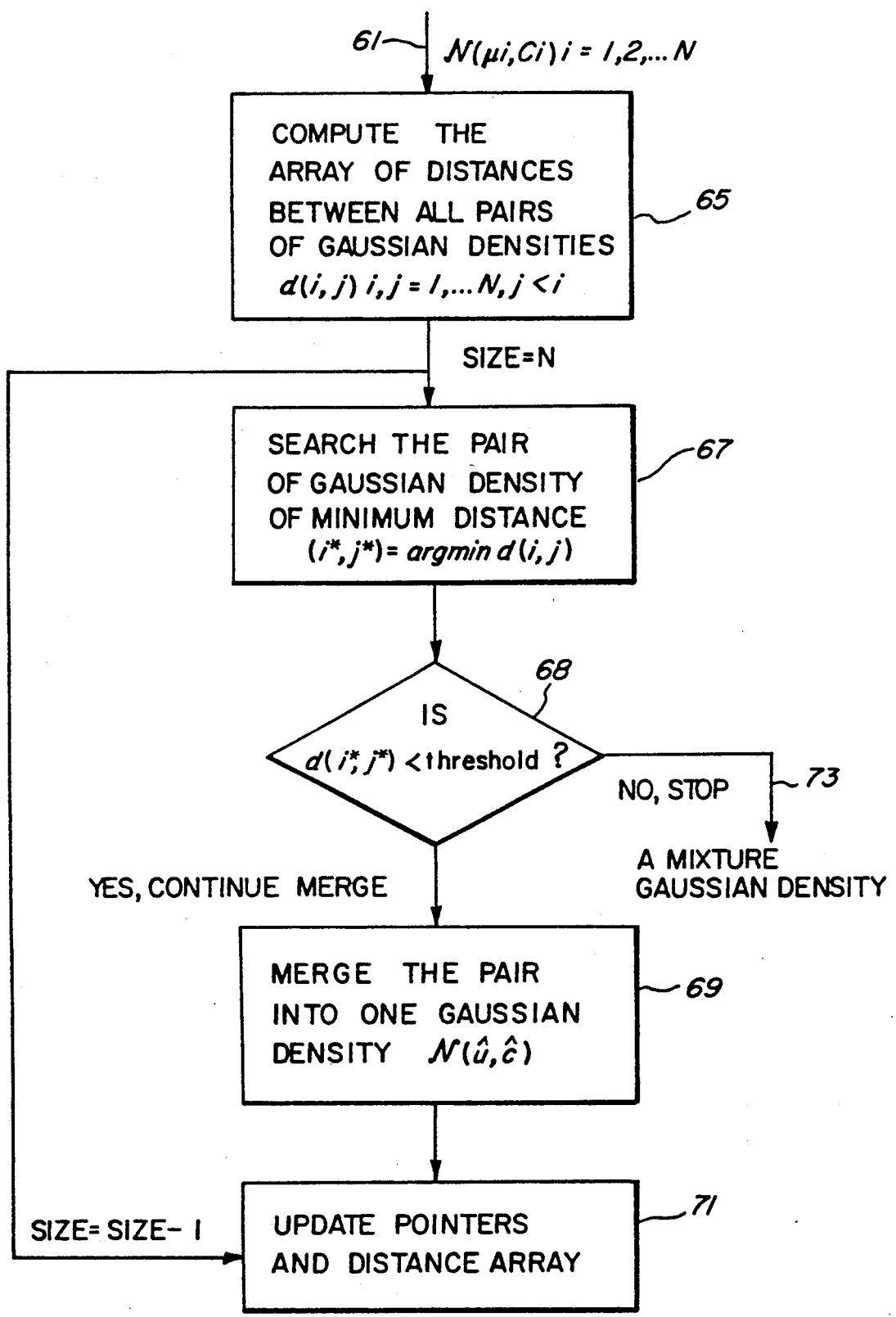
FIG. 6 is a flow chart illustrating the iterative procedure of model merging, where N Gaussian densities are merged into a mixture density.

The overall procedure of the merging module 39 is shown in the flow diagram of FIG. 6. From the input of the set of N Gaussian densities 61, abbreviated as $\eta(1)$, $\eta(2) \ldots \eta(N)$, the distances between all pairs of the Gaussian densities are computed 65 and put into a distance array of size N×N. Note that only the lower (or upper) triangular part of the matrix needs to be considered since the distance measure is symmetrical, which will be explained later. Next, the pair of Gaussian densities with the minimum distance is searched 67, and this minimum distance is compared against a threshold value 68. If the minimum distance is above or equal to the threshold value, the merging is completed 69, and the Gaussian densities remaining become the components of the mixture Gaussian density 73. Otherwise, the pair of Gaussian densities with the minimum distance is then merged into a single Gaussian density 69, as was explained in connection with FIG. 5 and defined in Equations (3)–(5). The Gaussian densities i* and j* are eliminated, and the new one is entered into the record as the N+1th Gaussian density designated as $\eta^*$ (N+1) below. The distances between the new Gaussian density and the rest of the Gaussian densities are calculated, and the pointers to the Gaussian densities and the distance array are then updated.

| INITIAL POINTERS TO MODELS | AFTER ONE STEP OF MERGING |
|---|---|
| pr[1] → N(1) | pr[1] → N(1) |
| pr[2] → N(2) | pr[2] → N(2) |
| . | . |
| pr[i*] → N(i*) | pr[i*] → N(i* + 1) |
| . | . |
| pr[j*] → N(j*) | pr[j*] → N(j* + 2) |
| . | . |
| pr[N − 1] → N(N − 1) | pr[N − 1] → N*(N + 1) |
| pr[N] → N(N) | |

First, the pointers of the Gaussian densities are updated 71 as shown above. Assuming $j^* > i^*$, the Gaussian densities $\eta(i^*)$ and $\eta(j^*)$ are eliminated. The pointers from i* to j*−1 points to the indices of models shifted up by one, and the pointer from j* to N−2 points to the indices of models shifted up by two. The new Gaussian density is now pointed to by the n−1the pointer.

i*+1 to j*−1 are shifted up by one row, and the rows from j*+1 to N are sifted up by two; the columns from i*+1 to j*−1 are shifted left by one columns, and the columns from j*+1 to N are shifted left by two. The distances between the newly-merged Gaussian density and the remaining Gaussian densities are appended to the last row of the array shown as the circled elements, and the updated array size becomes (N×1)×(N−1).

After the pointers of Gaussian densities and the distance array are updated 71, they are fed back to module 67 for searching the Gaussian density pair with minimum distance, and the whole process repeats until the minimum distance exceeds the threshold value. The remaining Gaussian densities become the components of the mixture Gaussian density 73 for a state of a speech unit. The threshold is an empirical value, and can be adjusted on a range of the desired resolution of models for discrimination between speech units.

The way to compute the distance between a pair of Gaussian densities is derived from the consideration of minimizing the increment of the average trace of the covariance matrices of the Gaussian densities when a pair of them are merged into one. The average trace is defined as $$T_N = \sum_{i=1}^{N} p_i \text{trace}(C_i)$$

where $$p_i = \frac{L_i}{\sum_{n=1}^{N} L_n}$$

| INITIAL DISTANCE ARRAY | | | | | | | | | | |
|---|---|---|---|---|---|---|---|---|---|---|
| | pr[1] | pr[2] | pr[3] | ... | pr[i*−1] | pr[i*] | ... | pr[j*−1] | pr[j*] | ... pr[N−1] pr[N] |
| pr[1] | | | | ... | | | | | | |
| pr[2] | X | | | ... | | | | | | |
| pr[3] | X | X | | ... | | | | | | |
| ... | ... | ... | ... | ... | | | | | | |
| pr[i*] | ☒ | ☒ | ☒ | ... | ☒ | | | | | |
| pr[i*+1] | X | X | X | X | X | ☒ | | | | |
| ... | ... | ... | ... | ... | ... | ☒ | | | | |
| pr[j*] | ☒ | ☒ | ☒ | ... | ☒ | ☒ | ☒ | ☒ | | |
| pr[j*+1] | X | X | X | X | X | ☒ | X | X | ☒ | |
| ... | | | | | | ☒ | ... | ... | ☒ | |
| pr[N] | X | X | X | X | X | ☒ | X | X | ☒ | X X |

| AFTER ONE STEP OF MERGING | | | | | | | | |
|---|---|---|---|---|---|---|---|---|
| | pr[1] | pr[2] | pr[3] | ... | pr[i−1] | pr[i] | ... | pr[N−2] pr[N−1] |
| pr[1] | | | | ... | | | | |
| pr[2] | X | | | ... | | | | |
| pr[3] | X | X | | ... | | | | |
| ... | ... | ... | ... | ... | | | | |
| pr[i] | X | X | X | ... | X | | | |
| ... | ... | ... | ... | ... | ... | | | |
| pr[N−1] | ⊗ | ⊗ | ⊗ | ... | ⊗ | ⊗ | ⊗ | ⊗ |

Second, the distance array is updated 71, as shown above. The elements in the distance array associated with indices i* and j⁸ are all eliminated, shown as the boxed elements in the i* th, j* th rows and columns. The array elements are then shifted toward the up-left direction to fill up the array. Specifically, the rows from When the pair of Gaussian densities of i* and j are merged, the remaining Gaussian densities will have an average trace as $$t_{N-1} = T_N + (p_i + p_j)\lambda_i \lambda_j \| \mu_i - \mu_j \|^2,$$

where the $\lambda$'s are calculated as in Equation (3) and the denotes a Euclidean distance. Therefore, the distance between a pair of Gaussian densities i and j is defined as $$d(i,j) = (p_i + p_j)\lambda_i \lambda_j \| \mu_i - \mu_j \|^2. \qquad 5$$

In the case that a feature vector consists of components of different scales, weighting factors on these components in the distance computation are incorporated. The new distance is then calculated as $$d(i,j) = (p_i + p_j)\lambda_i \lambda_j \| A(\mu_i - \mu_j) \|^2,$$

where $A = \text{diag}(a_1, \ldots, a_i, \ldots, a_M)$, and M being the dimensionality of the feature vector. The weight matrix A can be derived from training speech data in a variety of ways, and is computed for each state of each speech unit. Described below is a method of computing A for a specific choice for the structure of the feature vector:

$$\begin{bmatrix} c_1 \\ \ldots \\ c_L \\ p \\ \Delta c_1 \\ \ldots \\ \Delta c_L \\ \Delta p \end{bmatrix}$$

The expression above illustrates a choice for the feature vector with four scales, where $c = [c_l, \ldots c_L]'$ is a vector of the weighted cepstrum coefficients; for example, the lineally weighted capstrum coefficients; see Hansen et al., "Spectral Slope Distance Measures with Linear Predictive Analysis for Word Recognition in Noise," IEEE Trans. ASSP, ASSP-34, pp. 52–59, 1986, p is the logarithmic energy, both are per-frame-based features and are called instantaneous features; $\Delta c = [\Delta c_l, \ldots \Delta c_L]'$ is a vector of temporal regression coefficients of c, and $\Delta p$ is the temporal regression coefficient of p, both are derived from the frames of the symmetric neighborhood of the current frame and are called dynamic features. Let there be a total number of K frames of features for a state of a speech unit under consideration, then four quantities are calculated as $$r_1 = \sum_{k=1}^{K} \| c_k \|^2,$$

$$r_2 = \sum_{k=1}^{K} p_k^2,$$

$$r_3 = \sum_{k=1}^{K} \| \Delta c_k \|^2,$$

and $$r_4 = \sum_{k=1}^{K} (\Delta p_k)^2.$$

Letting $$S = \frac{1}{r_1} + \frac{1}{Lr_2} + \frac{1}{w_d r_3} + \frac{1}{w_d L r_4},$$

the diagonal elements of A are then calculated as $$a_i = \begin{cases} \frac{1}{r_1} S^{-1} & i \sim c \\ \frac{1}{Lr_2} S^{-1} & i \sim p \\ \frac{1}{w_d r_3} S^{-1} & i \sim \Delta c' \\ \frac{1}{w_d L r_4} S^{-1} & i \sim \Delta p \end{cases}$$

where $i \sim c$ denotes those i indexing the elements of the vector c, and so on. The weight $w_d$ is a parameter to control the weight on the dynamic features, which can be chosen empirically, e.g., $W_d = 2$ is a good choice.

The smoothing module 43 (FIG. 2) smooths the covariance matrices of the Gaussian densities of a mixture density by the covariance matrix of the fully-merged Gaussian density. The fully merged Gaussian density is estimated from all segments in a set of a state of a speech unit, i.e., $$\mu = \frac{1}{\sum_{i=1}^{N} L_i} \sum_{i=1}^{N} \sum_{l=1}^{L_i} x^{(i)}$$

and $$C = \frac{1}{\sum_{i=1}^{N} L_i} \sum_{i=1}^{N} \sum_{l=1}^{L_i} (x^{(i)} - \mu)(x^{(i)} - \mu)'$$

This smoothing is mandatory for the case when the covariance matrices of some mixture components are singular or near singular. The smoothing operation can also increase the robustness of a mixture Gaussian density model when it was not trained from enough speech data, which is often the case. Specifically, the smoothing is done by interpolating the covariance matrix $C_i$ of a mixture component by the covariance matrix C of the fully-merged Gaussian density, i.e., $$\hat{C}_i = \lambda C_i + (1 - \lambda) C$$

where $0 \leq \lambda \leq 1$. If a covariance matrix has a block diagonal structure such as shown below:

$$\begin{bmatrix} C_s & 0 \\ 0 & C_d \end{bmatrix},$$

the smoothing can also be done selectively on different blocks. The covariance matrix above shows a structure of two diagonal blocks $C_s$ and $C_d$, one for the instantaneous features, and the other for the dynamic features. This structure of the covariance matrix is in accord with the simplifying assumption that the instantaneous features and dynamic features are statistically independent. One way of doing the selective smoothing is to smooth the covariance block of the instantaneous feature unanimously, and smooth the covariance block of the dynamic features only when it is singular or has too sharp a distribution.

The sharpness of a Gaussian distribution can be measured by its height at its mean point, i.e., $$f(x; \mu_i, C_i)|x = \mu_i \sim \frac{1}{|C_i|^{\frac{1}{2}}}.$$

where "$\sim$" signifies "proportional to." Therefore the geometric average height of the mixture components of a mixture density is proportional to $$\frac{1}{\left(\prod_{k=1}^{K} |C_k|^{\frac{1}{2}}\right)^{\frac{1}{K}}}.$$

For a mixture component i, a ratio is calculated as $$\text{ratio} = \frac{1/|C_i|^{\frac{1}{2}}}{1/\left(\prod_{k=1}^{K} |C_k|^{\frac{1}{2}}\right)^{\frac{1}{K}}}.$$

If this ratio is greater than a threshold, the covariance matrix is smoothed, otherwise it is left intact. Note that the covariance matrix $C_i$ explained can be substituted by the covariance matrix blocks $C_s$ or $C_d$ for block-wise smoothing.

In 45 of FIG. 2, the fully-merged Gaussian density from 53 is added to the smoothed mixture density from 43 as an extra mixture component for further improving model robustness. Therefore, the mixture densities from 45 have one more component than those from 43.

The weights of the mixture density are estimated in the modules 49 and 51 of FIG. 2. First, feature vector sequences are segmented into states of speech units, the reference models being the newly-generated mixture densities with uniform weights. The likelihood scores of each component are calculated and normalized on a per-frame basis. Let the likelihood score of a mixture component at a frame indexed by t be:

$$f(x_t/N(i)) = \frac{1}{(2\pi)^{M/2} |C_i|^{\frac{1}{2}}} \exp\left(-\frac{1}{2}(x_t - \mu_i) C_i^{-1} (x_t - \mu_i)'\right),$$

then the normalized score is:

$$\tilde{f}(x_t/N(i)) = \frac{f(x_t/N(i))}{\sum_{k=1}^{K} f(x_t/N(k))}.$$

These normalized scores are then averaged over each state of each contextual environment of a speech unit. A contextual environment of a speech unit is defined by the speech units within its neighborhood. For example, for the speech unit /aa/, the speech unit /hh/ and /r/ constitutes a neighborhood, as was shown in FIG. 3. Let the set of normalized scores of a state of a contextual environment of a speech unit be indexed by $t=1,\ldots,T$, then the weight of the ith mixture component is calculated as $$a_i = \frac{1}{T} \sum_{t=1}^{T} \tilde{f}(x_t/N(i)), i = 1, \ldots K.$$

The weights thus estimated are further interpolated by uniform weights to maintain robustness, i.e., $$\hat{a}_i = \lambda a_i + (1 - \lambda)\frac{1}{K}, i = 1, \ldots, K$$

where $0 < \lambda < 1.0$.

Finally, the model-training module 19 outputs 20 the mixture Gaussian densities for each state of each speech unit, and the mixture wights for each state of each context environment of each speech unit to a sentence decoder 21. The parameters of the Gaussian densities and their weights are then used as models in speech recognition in sentence decoder 21, which may continuously receive a speech sentence 23 and output the decoded word string 25.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A speech recognition system including a training module for estimating Gaussian densities for use in speech-unit models of the speech recognition system, said speech recognition system comprising:
   means for receiving an input speech signal;
   segmentation means for segmenting said speech signal into a plurality of speech units, each speech unit having a plurality of states, each state of each speech unit being a segment of said signal, each segment including a plurality of frames;
   means for grouping all segments corresponding to like speech unit states for like speech units into respective sets of segments for all states of all speech units;
   means for estimating parameters defining a Gaussian density for each segment of each set of segments;
   means for merging said Gaussian densities of each set into a mixture Gaussian density for the set; and
   means for using said mixture Gaussian densities for identifying speech units of additional input speech signals.

2. The speech recognition system of claim 1, wherein said means for merging comprises:
   means for calculating distances between all pairs of Gaussian densities in a set;
   means for sorting the calculated distances to find a Gaussian density pair separated by a minimum distance; and
   means for merging said minimum distance Gaussian density pair into a single Gaussian density.

3. The speech recognition system of claim 2, further comprising:
   means for iteratively carrying out a merging procedure of said merging means until the distance between the minimum distance pair is above a predetermined threshold.

4. The speech recognition system of claim 2 wherein said minimum distance pair is represented by indices $i^*$ and $j^*$, and a said merged Gaussian density is represented by $\hat{\mu}$ and $\hat{C}$, and wherein said means for merging said minimum distance Gaussian pair comprises:

means for calculating $\hat{\mu}$, wherein $\hat{\mu}$ is given by:

$$\hat{\mu} = \lambda_{i^*}\mu_{i^*} + \lambda_{j^*}\mu_{j^*}; \text{ and}$$

means for calculating $\hat{C}$, wherein $\hat{C}$ is given by:

$$\hat{C} = \lambda_{i^*}C_i + \lambda_{j^*} + \lambda_{i^*}\lambda_{j^*}(\mu_{i^*} - \mu_{j^*})(\mu_{i^*} - \mu_{j^*})';$$

wherein $\lambda_{i^*}$ is given by:

$$\lambda_{i^*} = \frac{L_i^*}{L_i^* + L_j^*}; \text{ and}$$

wherein $\lambda_{j^*}$ is given by:

$$\lambda_{j^*} = \frac{L_j^*}{L_i^* + L_j^*}.$$

5. The training module of claim 2, wherein a distance $d(i,j)$ between Gaussian density pairs i and j is given by:

$$d(i,j) = (p_i + p_j)\lambda_i\lambda_j \|\mu_i - \mu_j\|^2$$

$$p_i = \frac{L_i}{\sum_{n=1}^{N} L_n}.$$

6. The speech recognition system of claim 5, further comprising:
means for smoothing the mixture gaussian densities.

7. The speech recognition system of claim 7 wherein said means for smoothing the mixture Gaussian densities includes smoothing said mixture Gaussian density by a fully-merged Gaussian density.

8. The speech recognition system of claim 7 wherein said fully-merged Gaussian density is estimated from all segments in the set by calculating parameters $\mu$ and C defining said fully-merged Gaussian density as follows:

$$\mu = \frac{1}{\sum_{i=1}^{N} L_i} \sum_{i=1}^{N} \sum_{l=1}^{L_i} x_l^{(i)}$$

$$C = \frac{1}{\sum_{i=1}^{N} L_i} \sum_{i=1}^{N} \sum_{l=1}^{L_i} (x_l^{(i)} - \mu)(x_l^{(i)} - \mu)'$$

wherein N is the number of Gaussian densities in the set.

9. The speech recognition system of claim 8 wherein said smoothing of a mixture Gaussian density by said fully-merged Gaussian density comprises:
means for interpolating a covariance matrix $C_i$ of a mixture component by the covariance matrix C of the fully-merged Gaussian density, as follows:

$$\hat{C}_i = \lambda C_i + (1-\lambda)C$$

wherein $0 \leq \lambda \leq 1$.

10. The speech recognition system of claim 1, further comprising:
means for incorporating a fully-merged Gaussian density as an extra mixture component in the mixture density.

11. The training module of claim 10, further comprising:
means for estimating the weights of the mixture Gaussian densities.

12. The speech recognition system of claim 11 wherein said means for estimating the weights of said mixture Gaussian densities comprises:
means for initially setting the weights of the mixture Gaussian density to a uniform value;
means for using the mixture Gaussian density and the uniform weights as models of speech units to segment a chosen training sequence into states;
means for calculating the likelihood score of each mixture component on a per-frame basis in the associated labeled segments; and
means for averaging each likelihood score over each state of the context environment for each speech unit, said averaged scores becoming the weight of the mixture density.

13. The speech recognition system of claim 12 further comprising:
means for smoothing said weights of the mixture density by said uniform weights.

14. The speech recognition system of claim 13 further comprising:
means for providing the Gaussian mixture densities for each state of each speech unit and the weights of said Gaussian densities to be used as reference models in a speech recognition process.

15. The speech recognition system of claim 1 wherein said parameters defining a Gaussian density for each segment comprise $\hat{\mu}$ and $\hat{C}$, and wherein said means for estimating said parameters comprises:
means for calculating $\hat{\mu}_i$, wherein $\hat{\mu}_i$ is given by:

$$\hat{\mu}_i = \frac{1}{L_i} \sum_{l=1}^{L_i} x_l^{(i)};$$

wherein i is a segment index, $L_i$ is the number of frames in segment i, and $x_l^{(i)}$ is the lth feature vector in segment i; and
means for calculating $\hat{C}$, wherein $\hat{C}$ is given by:

$$\hat{C}_i = \frac{1}{L_i} \sum_{l=1}^{L_i} (x_l^{(i)} - \hat{\mu}_i)(x_l^{(i)} - \hat{\mu}_i)',$$

where the symbol ' denotes the transpose of a vector.

16. A method for speech recognition, said speech recognition method comprising the steps of:
receiving an input speech signal, segmenting the input speech signal into a plurality of speech units, each speech unit having a plurality of states, each state of each speech unit being a segment of said signal, each segment including a number of frames;
identifying said speech units;
grouping all speech segments corresponding to like speech unit states for like speech units into respective sets of segments for all states of all speech units;
estimating parameters defining a Gaussian density for each segment of each set of segments;
merging said Gaussian densities of each set into a mixture Gaussian density for the set; and
using a mixture Gaussian densities for identifying speech units of additional input speech signals.

17. The method of speech recognition of claim 16, wherein said step of merging comprises:
   calculating distances between all pairs of Gaussian densities in a set;
   sorting the calculated distances to find a Gaussian density pair separated by a minimum distance; and
   merging said minimum distance Gaussian density pair into a single Gaussian density.

18. The method of speech recognition of claim 17 wherein said minimum distance pair is represented by indices i* and j*, and a said merged Gaussian density is represented by $\hat{\mu}$ and $\hat{C}$, and wherein said means for merging said minimum distance Gaussian pair comprises:
   calculating $\hat{\mu}$, wherein $\hat{\mu}$ is given by:

$$\hat{\mu} = \lambda_{i^*}\mu_{i^*} + \lambda_{j^*}\mu_{j^*};$$

calculating $\hat{C}$, wherein $\hat{C}$ is given by:

$$\hat{C} = \lambda_{i^*}C_{i^*} + \lambda_{j^*}C_{j^*} + \lambda_{i^*}\lambda_{j^*}(\mu_{i^*} - \mu_{j^*})(\mu_{i^*} - \mu_{j^*})';$$

wherein $\lambda_{i^*}$ is given by $$\lambda_i^* = \frac{L_i^*}{L_i^* + L_j^*} \text{; and}$$

wherein $\lambda_j^*$ is given by:

$$\lambda_j^* = \frac{L_j^*}{L_i^* + L_j^*}.$$

19. The method of speech recognition of claim 17 further comprising the steps of:
   iteratively carrying out a merging procedure until the distance between the minimum distance pair is above a predetermined threshold.

20. The method of speech recognition of claim 17, wherein a distance d(i,j) between Gaussian density pairs i and j is given by:

$$d(i,j) = (p_i + p_j)\lambda_i\lambda_j \|\mu_i - \mu_j\|^2$$

where $$p_i = \frac{L_i}{\sum_{n=1}^{N} L_n}.$$

21. The method of speech recognition of claim 16, further comprising the step of:
   incorporating a fully-merged Gaussian density as an extra mixture component in the mixture density.

22. The method of speech recognition of claim 21, further comprising the step of:
   estimating the weights of the mixture Gaussian densities.

23. The method of speech recognition of claim 22 wherein said step of estimating the weights of said mixture Gaussian densities comprises:
   initially setting the weights of the mixture Gaussian density to a uniform value;
   using the mixture Gaussian densities and the uniform weights as models of speech units to segment a chosen training sequence into states;
   calculating the likelihood score of each mixture component on a per-frame basis in the associated labeled segments; and
   averaging likelihood scores of each mixture component over each state of the context environment for each speech unit, said averaged scores becoming the weights of the mixture density.

24. The method of speech recognition of claim 23 further comprising the step of:
   smoothing said weights of the mixture density by said uniform weights.

25. The method of speech recognition of claim 24 further comprising:
   providing the Gaussian mixture densities for all states of all speech units and the weights of said Gaussian densities to be used as reference models in a speech recognition process.

26. The method of speech recognition of claim 16 wherein said set of parameters defining a Gaussian density comprise $\hat{\mu}$ and $\hat{C}$, and wherein said step of estimating said parameters comprises:
   calculating $\mu$, wherein $\mu$ is a vector given by:

$$\hat{\mu}_i = \frac{1}{L_i} \sum_{l=1}^{L_i} x_l^{(i)};$$

wherein i is a segment index, $L_i$ is the number of frames in segment i, and $x_l^{(i)}$ is the lth feature vector in segment i; and
   calculating C, wherein C is a matrix given by:

$$\hat{C}_i = \frac{1}{L_i} \sum_{l=1}^{L_i} (x_l^{(i)} - \hat{\mu}_i)(x_l^{(i)} - \hat{\mu}_i)',$$

wherein the symbol ' denotes the transpose of a vector.

27. The method of speech recognition of claim 26, further comprising the step of:
   smoothing the mixture Gaussian densities.

28. The method of speech recognition of claim 27 wherein said step of smoothing the mixture Gaussian densities includes smoothing said mixture Gaussian density by a fully-merged Gaussian density.

29. The method of speech recognition of claim 28 wherein said fully-merged Gaussian density is estimated from all segments in the set by calculating parameters $\mu$ and C defining said fully-merged Gaussian density as follows:

$$\mu = \frac{1}{\sum_{i=1}^{N} L_i} \sum_{i=1}^{N} \sum_{l=1}^{L_i} x_l^{(i)}$$

$$C = \frac{1}{\sum_{i=1}^{N} L_i} \sum_{i=1}^{N} \sum_{l=1}^{L_i} (x_l^{(i)} - \mu)(x_l^{(i)} - \mu)'$$

wherein N is the number of Gaussian densities in th set and wherein the symbol ' denotes the transpose of a vector.

30. The method of speech recognition of claim 29 wherein said step of smoothing of a mixture Gaussian density by said fully-merged Gaussian density comprises the step of:
   interpolating the covariance matrix $C_i$ of a mixture component by the covariance matrix C of the fully-merged Gaussian density, as follows:

$$\hat{C}_i = \lambda C_i + (1-\lambda) C,$$

wherein $0 \leq \lambda \leq 1$.

* * * * *